(12) United States Patent
Bergeleen et al.

(10) Patent No.: US 9,538,738 B2
(45) Date of Patent: Jan. 10, 2017

(54) HORSESHOE ASSEMBLY AND A METHOD OF MOUNTING THE SAME ONTO A HORSE HOOF

(71) Applicants: Lyle Eugene Bergeleen, Austin, TX (US); Frankie Waitim Wong, Chicago, IL (US)

(72) Inventors: Lyle Eugene Bergeleen, Austin, TX (US); Frankie Waitim Wong, Chicago, IL (US)

( * ) Notice: Subject to any disclaimer, the term of this patent is extended or adjusted under 35 U.S.C. 154(b) by 199 days.

(21) Appl. No.: 13/999,605

(22) Filed: Mar. 12, 2014

(65) Prior Publication Data
US 2014/0262353 A1    Sep. 18, 2014

Related U.S. Application Data

(60) Provisional application No. 61/851,788, filed on Mar. 13, 2013.

(51) Int. Cl.
*A01L 3/00*    (2006.01)
*A01L 5/00*    (2006.01)
*A01L 1/04*    (2006.01)

(52) U.S. Cl.
CPC .. *A01L 3/00* (2013.01); *A01L 1/04* (2013.01); *A01L 5/00* (2013.01)

(58) Field of Classification Search
CPC ............... A01L 1/00; A01L 1/04; A01L 3/00; A01L 3/04; A01L 5/00
See application file for complete search history.

(56) References Cited

U.S. PATENT DOCUMENTS

| 44,009 | A | * | 8/1864 | Mallett | A01L 1/04 168/7 |
|---|---|---|---|---|---|
| 374,727 | A | | 12/1887 | Bingham | |
| 382,131 | A | | 5/1888 | Bingham | |
| 427,976 | A | | 5/1890 | Curtin | |
| 437,152 | A | * | 9/1890 | Green | A01L 1/04 168/35 |
| 513,360 | A | * | 1/1894 | Covell | A01L 3/00 168/22 |
| 583,723 | A | * | 6/1897 | Anderson | A01L 7/04 168/1 |

(Continued)

FOREIGN PATENT DOCUMENTS

| CA | GB 191514777 A | * | 3/1916 | ............... A01L 3/00 |
|---|---|---|---|---|
| FR | GB 1269721 A | * | 4/1972 | ............... A01L 3/00 |

(Continued)

*Primary Examiner* — Kathleen Alker
(74) *Attorney, Agent, or Firm* — Frankie W. Wong

(57) ABSTRACT

A horseshoe assembly and a method for mounting the horseshoe assembly onto a hoof is disclosed. The horseshoe assembly includes a core and a sole, wherein the sole overlays or encapsulates the core, and the core being mounted directly beneath a surface of a horse hoof. The method including: securing a cover plate over the horse hoof, the cover plate includes a plurality of anchor points distributed across the cover plate; disposing the horseshoe assembly beneath the horse hoof with the core directly contacting the bottom surface of the horse hoof; and utilizing one or more tying elements, securing the horseshoe assembly to the bottom surface of the horse hoof with a binding force which presses one or both of the core and the sole against the bottom surface of the horse hoof.

29 Claims, 10 Drawing Sheets

(56) References Cited

U.S. PATENT DOCUMENTS

| | | | |
|---|---|---|---|
| 681,370 A | 8/1901 | Padden | |
| 766,443 A * | 8/1904 | Haller | A01L 7/00 168/20 |
| 778,909 A | 1/1905 | Simmons | |
| 800,239 A * | 9/1905 | Paul | A01L 1/04 168/8 |
| 841,031 A | 1/1907 | Martins | |
| 872,191 A * | 11/1907 | Nagley | A01L 1/04 168/8 |
| 1,039,002 A * | 9/1912 | Winston | A01L 3/00 168/1 |
| 1,094,474 A * | 4/1914 | Reece | A01L 7/04 168/1 |
| 1,174,848 A * | 3/1916 | Gear | A01L 3/00 168/18 |
| 1,198,672 A * | 9/1916 | Shomer | A01L 3/00 168/18 |
| 1,296,203 A * | 3/1919 | Mohr | A01L 7/04 168/1 |
| 1,337,194 A * | 4/1920 | Capewell | A01L 3/04 168/21 |
| 1,351,769 A * | 9/1920 | Leinweber | A01L 3/04 168/19 |
| 1,375,096 A * | 4/1921 | Hirschenfeld | A01L 3/04 168/18 |
| 1,420,331 A * | 6/1922 | Meyer | A01L 7/04 168/22 |
| 1,688,251 A * | 10/1928 | Trakalo | A01L 7/04 168/17 |
| 1,911,187 A * | 5/1933 | Gray | A01L 1/04 168/14 |
| 2,105,242 A * | 1/1938 | Gray | A01L 7/02 168/14 |
| 3,519,079 A * | 7/1970 | Bieber | A01L 3/00 168/12 |
| 3,732,929 A * | 5/1973 | Glass | A01K 13/007 168/18 |
| 4,013,126 A * | 3/1977 | Spencer | A01L 3/00 168/17 |
| 4,036,302 A * | 7/1977 | Spencer | A01L 1/04 168/17 |
| 4,206,811 A * | 6/1980 | Dallmer | A01L 3/02 168/17 |
| 4,265,314 A * | 5/1981 | Tovim | A01L 5/00 168/17 |
| 4,346,762 A | 8/1982 | Tovim | |
| 4,513,824 A | 4/1985 | Ford | |
| 5,692,569 A | 12/1997 | Constantino | |
| 5,699,861 A | 12/1997 | Sigafoos | |
| 5,842,523 A * | 12/1998 | Stuebbe | A01L 5/00 168/4 |
| 6,076,607 A | 6/2000 | Bergeleen | |
| 6,082,462 A | 7/2000 | Lyden | |
| 6,349,773 B1 | 2/2002 | Logan | |
| 6,497,293 B1 | 12/2002 | Miller | |
| 6,694,713 B1 * | 2/2004 | MacDonald | A01K 13/007 168/18 |
| 6,843,323 B2 | 1/2005 | Poynton | |
| 7,409,818 B2 * | 8/2008 | Llewellyn | A01L 11/00 168/4 |
| 7,793,734 B2 | 9/2010 | Burns | |
| 8,408,320 B2 | 4/2013 | Burns | |
| 2005/0034877 A1 | 2/2005 | Bergeleen | |
| 2012/0005995 A1* | 1/2012 | Emery | A01K 13/007 54/82 |
| 2012/0222871 A1* | 9/2012 | Mahidhara | A01L 1/02 168/6 |
| 2014/0109440 A1* | 4/2014 | McDowell | A43B 3/246 36/103 |
| 2014/0250723 A1* | 9/2014 | Kohatsu | A43B 3/26 36/88 |
| 2014/0251642 A1* | 9/2014 | Revheim | A01L 3/02 168/18 |
| 2014/0374124 A1* | 12/2014 | Mahidhara | A01L 1/02 168/6 |
| 2015/0366181 A1* | 12/2015 | Koenig | A01L 5/00 168/12 |

FOREIGN PATENT DOCUMENTS

| | | | | |
|---|---|---|---|---|
| GB | 140601 A | * | 4/1920 | A01L 3/04 |
| GB | 142479 A | * | 5/1921 | A01L 3/04 |
| GB | 2098048 A | * | 11/1982 | A01L 3/00 |

* cited by examiner

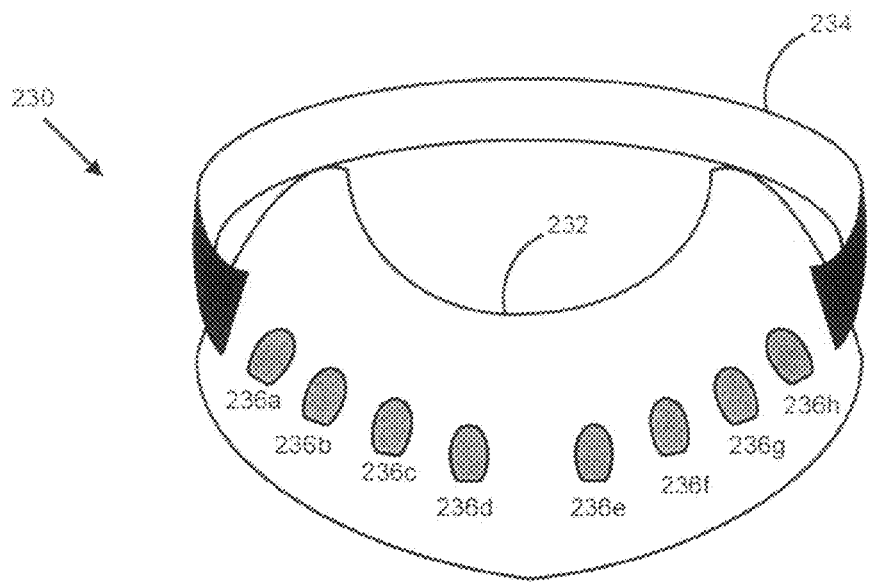
Fig. 2B
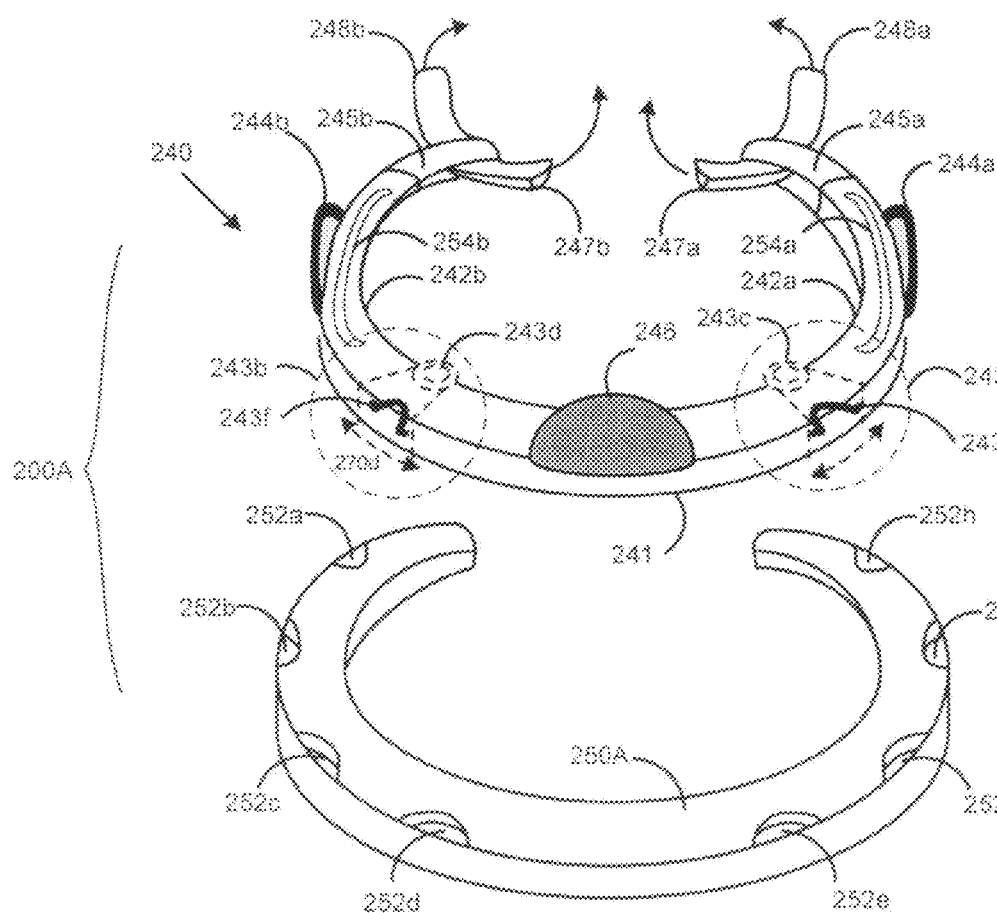
Fig. 2C
Fig. 2D

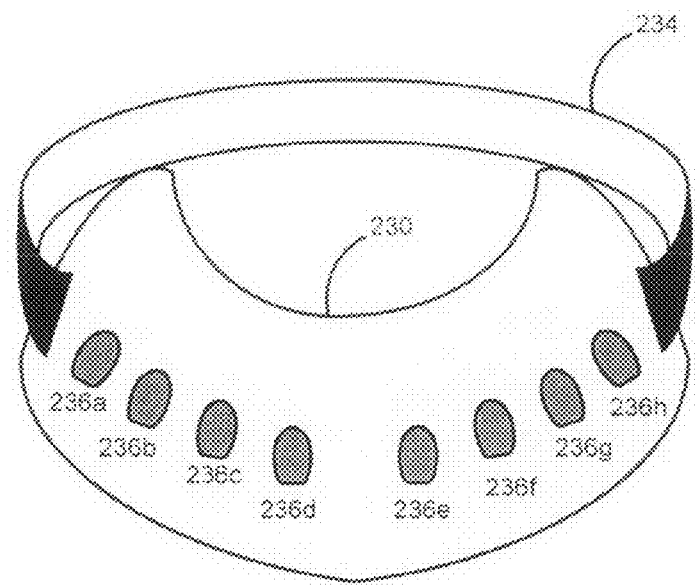
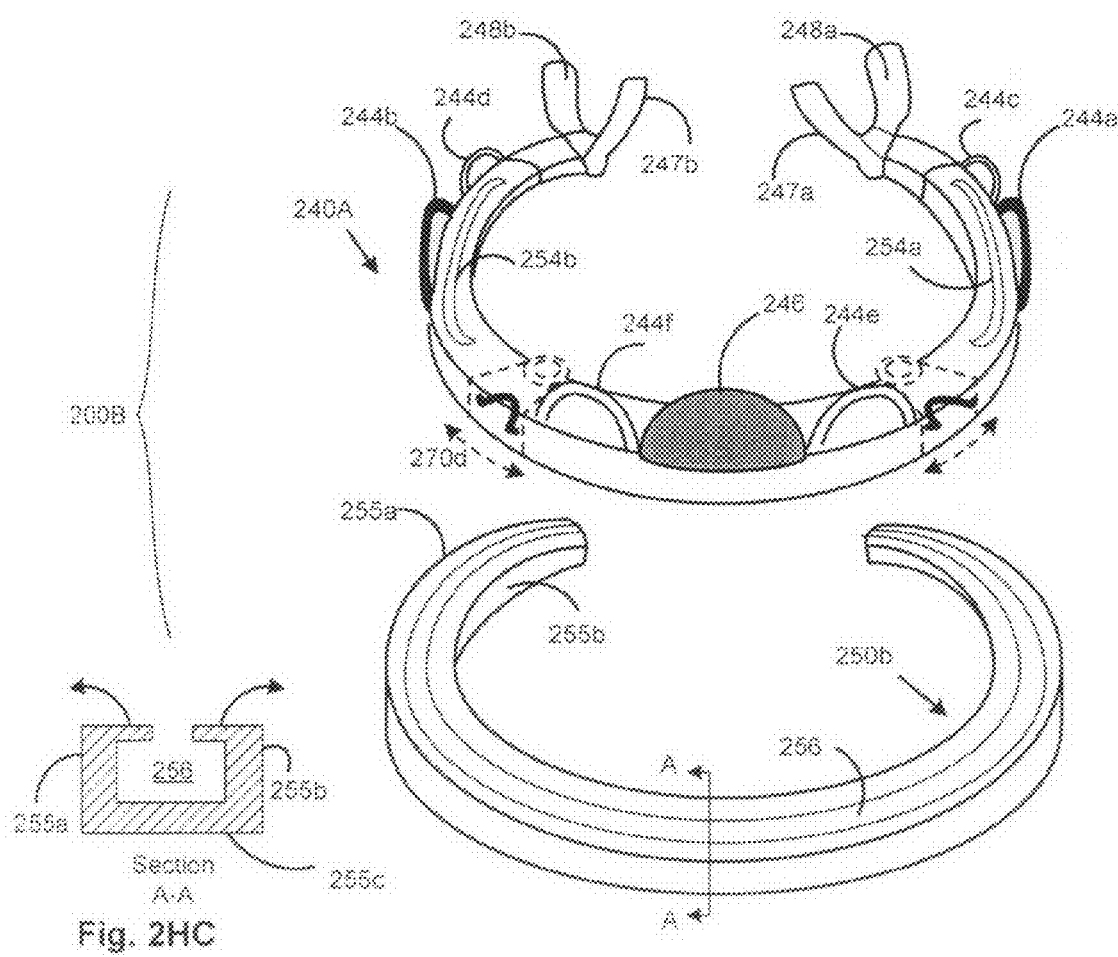
Fig. 2HC
Fig. 2HB

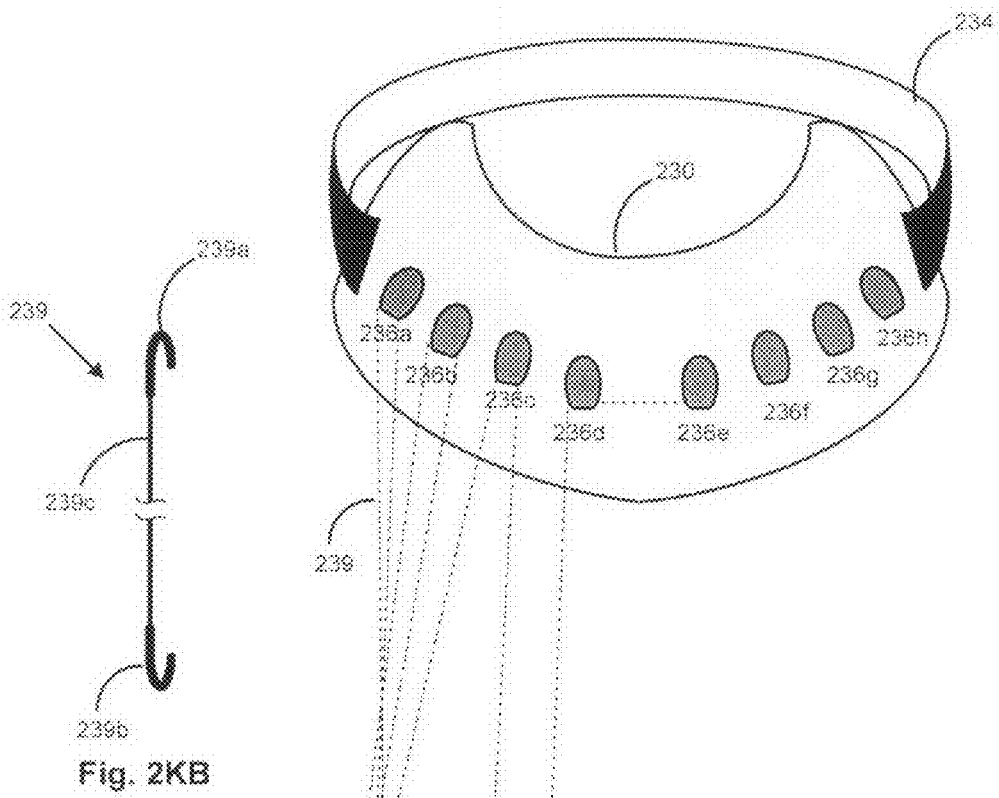
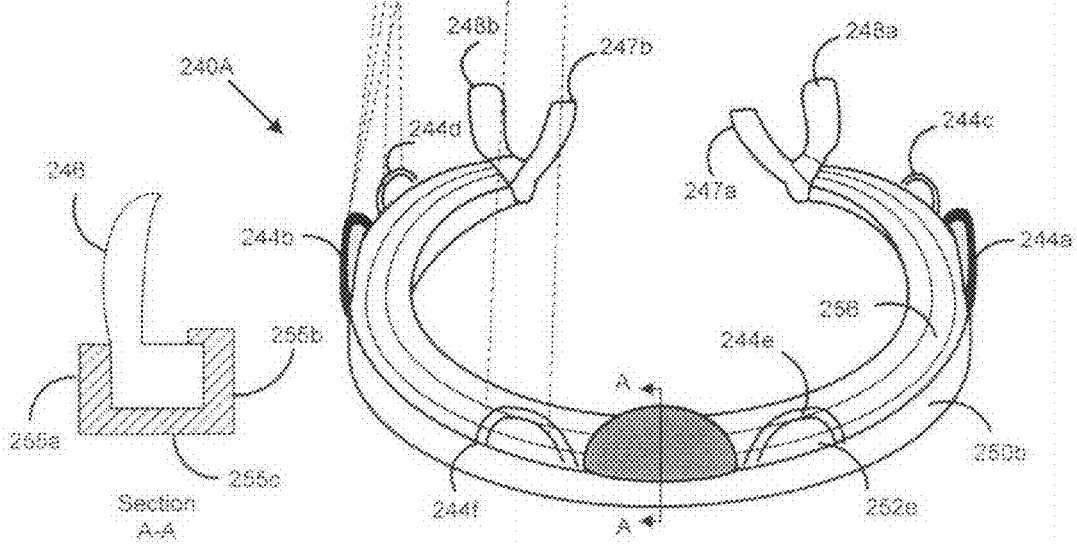
Fig. 2KB
Fig. 2KC
Section A-A
Fig. 2KA

HORSESHOE ASSEMBLY AND A METHOD OF MOUNTING THE SAME ONTO A HORSE HOOF

CROSS-REFERENCE TO RELATED APPLICATIONS

This application claims the benefit and priority to the U.S. Provisional Application No. 61/851.788, titled "A Horseshoe Assembly and A Method Of Mounting the same onto a Horse Hoof", filed on Mar. 13, 2013, which is hereby incorporated by reference in its entirety.

FIELD OF THE TECHNOLOGY

The present application relates to various components which form a horseshoe assembly, and a method according to mounting the same onto a horse hoof.

INCORPORATION BY REFERENCE

To assist the reader better understand the scope of the technology and the terminology used throughout the application, the following publications: U.S. Pat. No. 6,076,607, US Patent Publication No. 2005/003487, "Hoof Talk, The Hairline Tells It All" and "The Natural Trim" (books published by Lyle E. Bergeleen), and videos titled: "HoofTalk Equilibrium A Horseman's Revolution", "The Natural Trim", "Horsemanship For the First Trim", "Founder: The Thrill of Victory and the Agony of De Feet", are incorporated by reference in their entireties as part of the disclosure.

BACKGROUND

Horseshoes serve as protective shoes to protect horse hoofs from wearing out over time caused by impacts and abrasions on terrain surfaces. Horseshoes may be designed to improve speed performance of a racing horse or to improve traction on terrains or road surfaces, or simply to reduce wear and tear on a hoof capsule (110), which is a keratinous protein protective layer of tissue, beneath the horse hoof (similar to human finger nail).

As a result, different horseshoe designs are made available to provide better performance on certain competitive events such as horse racing, sport horses, show horses, English and Western riding disciplines, horse harness activities, or simply the horseshoes are to provide better comfort to the horse hoofs while engaging rider's leisurely horse activities or any horse usage.

FIG. 1A illustrates a side view (100A) of a current method of mounting a horseshoe onto a horse hoof (102). More specifically, FIG. 1 depicts a side view of a lower portion of a horse leg, which a hair line (104) demarcates a horse hoof (102) from a pastern column (106). A front portion of the horse hoof (102) is known as a toe (103), where a hind portion of the horse hoof (102) is known as a heel (108). There exists a small cavity or pocket area (shown as dotted lines with details in FIG. 1B) which extends from a rearmost end of the heel (108) towards a center of the horse hoof (102). The small cavity includes a frog area (110b) (because it shapes like a frog when viewed from the bottom) and a buttress area (110a). As seen in FIG. 1A, the current practice of mounting a horseshoe (150) involves simply nailing (154) the horseshoe (150) onto the hoof capsule (110) at the bottom surface (107) of the horse hoof (102).

FIG. 1B illustrates a bottom view (100B) of a current practice method in mounting a horseshoe beneath a horse hoof as shown in FIG. 1A. Referring to FIG. 1B, there is shown a U shaped horseshoe (150) shaped and contoured to fit beneath the horse hoof. The horseshoe (150) typically includes a groove or a slot (152) or punched holes which are aligned along each side to enable direct nailing of nails (154a-154h) onto the hoof capsule (110) in order to secure the horseshoe (150) beneath the horse hoof (102).

FIG. 1B also depicts the frog area (110b) and the buttress area (110b) (shaded portion), which is a small cavity or pocket area near a heel (108) of the horse hoof. The frog area (110b) is made up of mostly soft tissues, which extends towards a center of the horse hoof (102) and the frog area (110b) terminates at the apex (110c).

The inventor of the pending disclosure has contributed to some studies (see the above cited references) to support an observation that horses which roam in the wild without horseshoes tend to have more healthy hooves than horses having rigid horseshoes (150) nailed under their hooves (102). For example, one of the indications of the health of the horse hoof (102) may be observed by inspecting how uniform is a horse hoof hairline (104) and by inspecting the wearing of soft tissues in the frog area (110b) under the horse hoof (102). A subject of finding an optimal balance position to mount a horseshoe under the hoof to improve horse standing posture which mitigates fatigue on the hoofs has been discussed.

The inventor has discovered that the existing horseshoe designs and the current practice in horseshoe mounting (i.e., nailing) cause confinement or restriction to the natural movement of the horse hoof (102) due to natural loading (i.e., see FIG. 1A, a downward compressive force (170) on the horse hoof or upon ground impact from standing, trotting or running). Such confinement to natural horse hoof movement by the horseshoe (150) tends to restrict blood flows to the horse hoof (102). Over an extended period of time, confinements to the horse hoof movements or blood flow restriction may accelerate fatigue and contribute to an unhealthy hoof because of a tourniquet binding effect causing rigidity of the toe regions as they relate to the sides of the hoof capsule.

In addition, the current practice (see FIGS. 1A, 1B) of horseshoe mounting by nailing (154) does not provide flexibility and ease in mounting and dismounting a horseshoe (150). It may be desirable to mount a suitable type of horseshoe for a specific riding purpose based on terrain types (paved or unpaved, rocky or smooth), distance, activities to perform (e.g., racing, jumping, pulling) and based on the physical condition of the horse.

The efforts of mounting (nailing) and dismounting (un-nailing) horseshoes are nevertheless, quite tedious, time consuming and can be costly since it involves training and knowledge to properly perform such tasks. In addition, improper positioning of a horseshoe (150) at an optimal distance from the apex (110c) without considering proper load balance distributed on the horse leg may cause premature injury to a horse hoof. Moreover, excessive nailing and un-nailing of a horseshoe (150) may quickly wear out the hoof capsule (110) (i.e., the keratinous protein layer of tissue similar to human finger nail) which would require time to grow back.

SUMMARY

An embodiment of the present disclosure discloses a horseshoe assembly and a method for mounting the horseshoe assembly, wherein the horseshoe assembly being directly mounted beneath a surface of a horse hoof. The horseshoe assembly may include at least a core and a sole, wherein the sole may overlay or encapsulate the core. The method may include: securing a cover plate over the horse hoof, wherein the cover plate may include a plurality of anchor points distributed across the cover plate; disposing the horseshoe assembly beneath the horse hoof with the core directly contacting the bottom surface of the horse hoof; and utilizing one or more tying elements to secure the horseshoe assembly to the bottom surface of the horse hoof with a binding force which presses the horseshoe assembly one or both of: the core and the sole against the bottom surface of the horse hoof.

Another embodiment of the disclosure discloses a core for forming a horseshoe assembly which is directly mounted beneath a surface of a horse hoof. The core may include: a center piece, a first side arm piece and a second side arm piece, wherein the first side arm piece and the second side arm piece are each pivotally coupled to the center piece through a first pivoting region with a first hinge and a second pivoting region with a second hinge, respectively, wherein the first hinge and the second hinge enables the first side arm piece and the second side arm piece to both pivot towards each other and pivot away from each other, respectively.

Another embodiment of the disclosure discloses a sole, which overlays or encapsulates a core to form a horseshoe assembly for mounting on a horse hoof. The sole may be constructed of a material which is relatively more flexible than the core, wherein the sole is constructed from one of: a solid molded piece which is shaped to overlay the core, wherein the sole having a plurality of openings disposed along a contour of an outer edge of the sole for binding to a plurality of anchor points distributed across a cover plate which is secured over the horse hoof, utilizing one or more tying elements to secure the horseshoe assembly to the bottom surface of the horse hoof by forming a binding force which presses one or both of: the core and the sole against the bottom surface of the horse hoof. In another embodiment, the sole may be a tubular piece or pieces with walls on three sides which encapsulates the core on an inner side, an outer side and a bottom side of the sole, or a molded layer which entirely encapsulates the core, wherein the sole provides cushioning comfort and improved traction for the horse hoof Yet another embodiment of the disclosure discloses a cover plate which is shaped for covering a horse hoof. The cover plate may include: an adjustable strap which wraps around a heel region of the horse hoof for securing the cover plate onto the horse hoof; and a plurality of anchor points which are disposed on a surface and across the cover plate. The plurality of anchor points may be binding locations to establish a binding force utilizing one or more tying elements which secure a horseshoe assembly to be mounted directly beneath a surface of the horse hoof, wherein the binding force presses the horse shoe assembly directly against the bottom surface of the horse hoof.

The various embodiments in the disclosure provide at least the following advantages:

1) A method of mounting a horseshoe assembly directly beneath a surface of a horse hoof. A binding mechanism utilizing tying elements in conjunction with a cover plate to establish a binding force which presses the horseshoe assembly against the bottom surface of the horse hoof. The binding mechanism therefore eliminates using nails for mounting the horseshoe assembly, and consequently no un-nailing is necessary when dismounting. The binding mechanism eases the effort of mounting and dismounting task, which requires substantially lower skill level requirements to perform.

2) The horseshoe assembly includes features which mitigate stresses on the horse hoof and therefore may lead to a more healthy horse hoof over time during its service. For example, the horseshoe assembly may include at least a core and a flexible sole with a combined weight to be less than a typical metallic horseshoe. The core may be made thinner and lighter using a combination of materials to provide sufficient strength. Likewise, the sole may be made from a combination of materials to provide flexibility and durability to provide better traction with reduced noise level upon impact on paved roads.

In addition, the horseshoe assembly may be provided as a kit with different parts to form a core, and the kit may include one or more soles. The core may be assembled and customized to fit different hoof sizes. Sole types and pieces may be selected to overlay or encapsulate the core to meet different riding purposes, and for easy replacement when worn.

Furthermore, the horseshoe assembly includes a spring loaded design which adapts to natural hoof movements and flexibility upon pressing or impact on the terrain. More specifically, the core includes at least two opposite side arm pieces which pivot away from each other to accommodate a natural movement of the horse hoof when loaded (i.e., impact on the terrain). The two opposite side arm pieces pivot back towards each other and restore to a neutral position when unloaded (i.e., lifting the horse hoof). In addition, the sole on the horseshoe assembly may cushion the horse hoof for better comfort to the horse and may provide better traction.

BRIEF DESCRIPTION OF THE DRAWINGS

The accompanying drawings are included to provide a further understanding of the claims, are incorporated in, and constitute a part of this specification. The detailed description and illustrated embodiments described serve to explain the principles defined by the claims.

FIG. 2A illustrates an exemplary horseshoe assembly mounting method utilizing a tying element without using nailing for mounting, according to an embodiment of the disclosure.

FIG. 2B illustrates a perspective view of an exemplary cover plate for use with a horseshoe assembly, according to an embodiment of the disclosure.

FIG. 2C illustrates a perspective view of an exemplary core, which is disposed directly beneath the surface of the horse hoof, according to an embodiment of the disclosure.

FIG. 2D illustrates a perspective view of an exemplary sole which overlays or encapsulates the core, according to an embodiment of the disclosure.

FIG. 2HB illustrates a perspective view of a horseshoe assembly using a tubular sole to encapsulate the core, according to another embodiment of the disclosure.

FIG. 2HC illustrates a cross section view of an exemplary tubular sole, according to an embodiment of the disclosure.

FIG. 2KA illustrates another binding method without using nailing, utilizing the horseshoe assembly depicted in FIG. 2HB, and utilizing hook ties as tying elements, according to another embodiment of the disclosure.

FIG. 2KB illustrates an embodiment of a hook tie as the tying element for binding the horseshoe assembly directly beneath the surface of the horse hoof, as depicted in FIG. 2HA.

FIG. 2KC illustrates a cross sectional view of the tubular sole which encapsulates the core at the toe region, as depicted in FIG. 2KA.

Figure 1A:
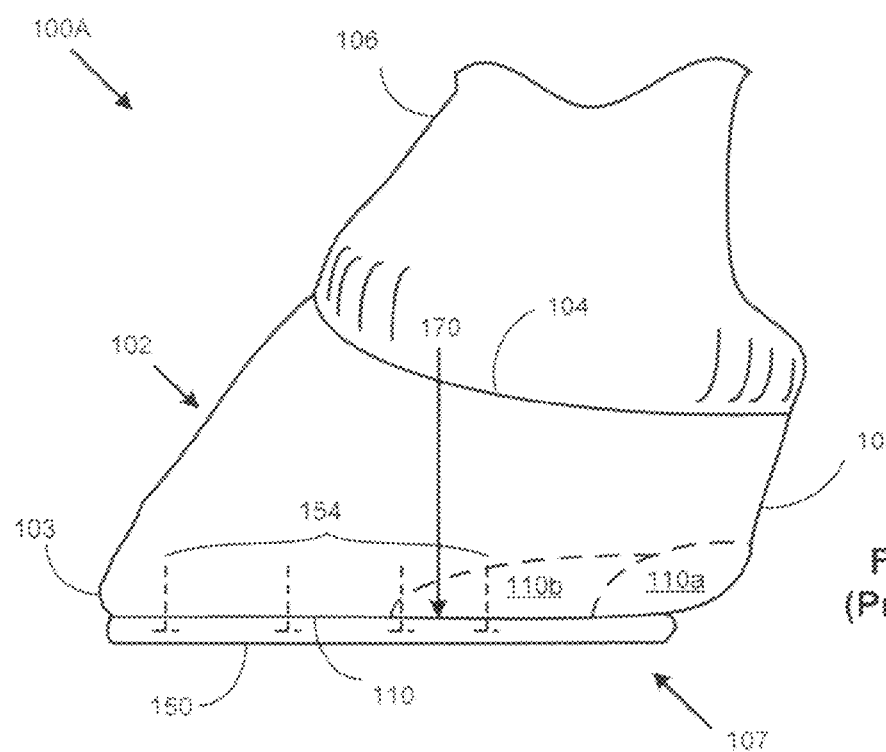
FIG. 1A illustrates a side view of a current practice method of mounting a horseshoe onto a horse hoof.

The following legends may be referred to in the various figures:
100A Side view of horseshoe mounting (current practice)
100B Bottom view of horseshoe mounting (current practice)
102 horse hoof
103 toe
104 hair line
106 pastern column
107 bottom surface
108 heel
110 hoof capsule
110a buttress area
110b frog area
110c apex
150 horseshoe
152 groove or slots
154a-154d nails
170 loading or compressive force
200A horseshoe assembly mounting (solid sole)
200B horseshoe assembly mounting (tubular sole)
202 horse hoof
203 toe portion
207 bottom surface
208 heel region
230 cover plate
232 front plate
234 strap (adjustable)
236a-236h anchor points (grommets, clips, buttons or the like)
238 tying element (e.g., laces, ties, hooks)
239 hook tie
239a,b hook
239c tie
240 core
240B core (encapsulated with the flexible tubular sole)
241 center piece
242a,b first and second side arm piece
243 pivoting region
243a, b first and second pivoting regions
243c,d first and second hinges
243e,f first and second hinge spring
244 attachment loop/side clip
244a-f plurality of attachment loops/side clips
244a,b first and second attachment loops/side clips
245 heel adjustment piece
245a,b first and second heel adjustment piece
246 toe clip
247a,b first and second frog clips
248a,b first and second buttress clips
250a sole (solid)
250b sole (tubular)
252a-h plurality of openings (for lacing or hook clipping)
254a,b first and second groove or slots (for optional nailing)
255a-c first, second and third walls (tubular piece)
256 tubular sole opening (for encapsulation onto the core 240)
260 tension ties, laces, hooks
270 loading force
270a, 270b stress or stored energy
270d compressive force (due to loading)
271a coupling spring (V-shaped spring)
271b coupling spring (arch shaped spring)
271c coupling spring (coil spring)
273 opposite force

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment may be described in details. Similar features may be referenced back to the prior descriptions in a prior numbered drawing or referenced ahead to a higher numbered drawing.

Figure 2A:
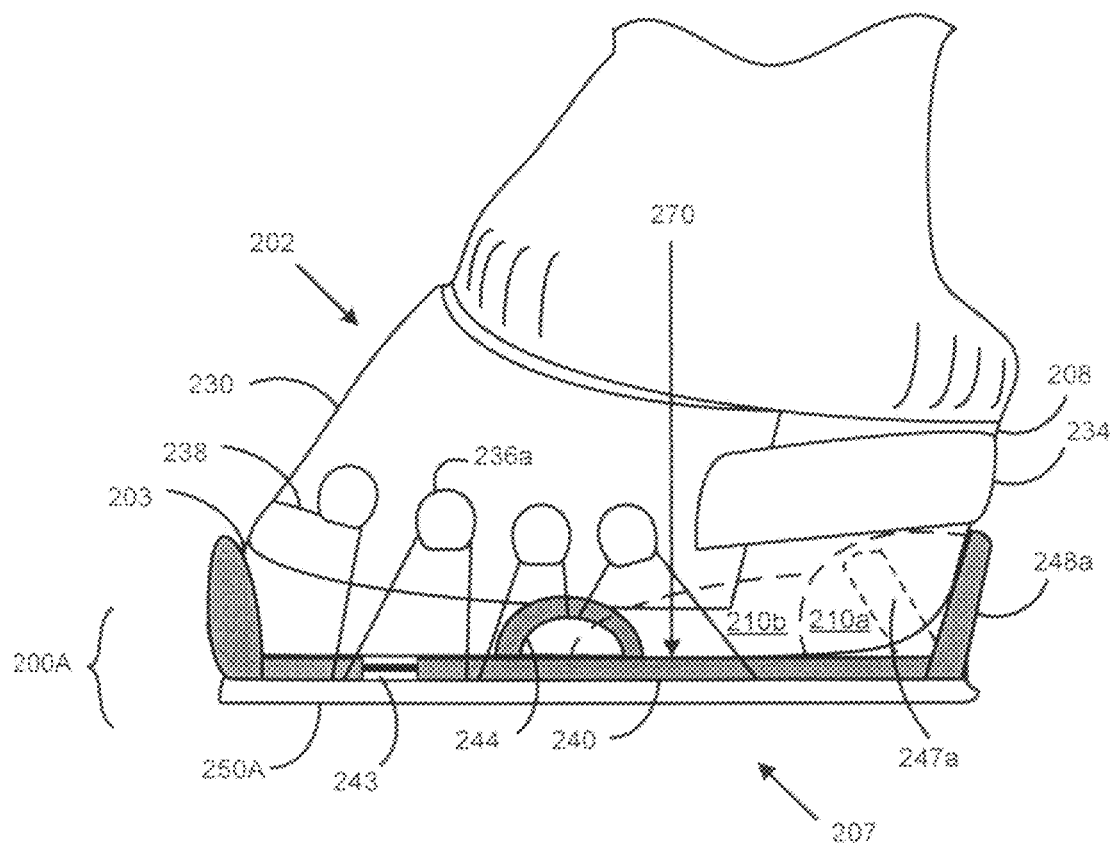
FIG. 2AA illustrates an exemplary method of mounting a horseshoe assembly, according to an embodiment of the disclosure.
Figure 2A:
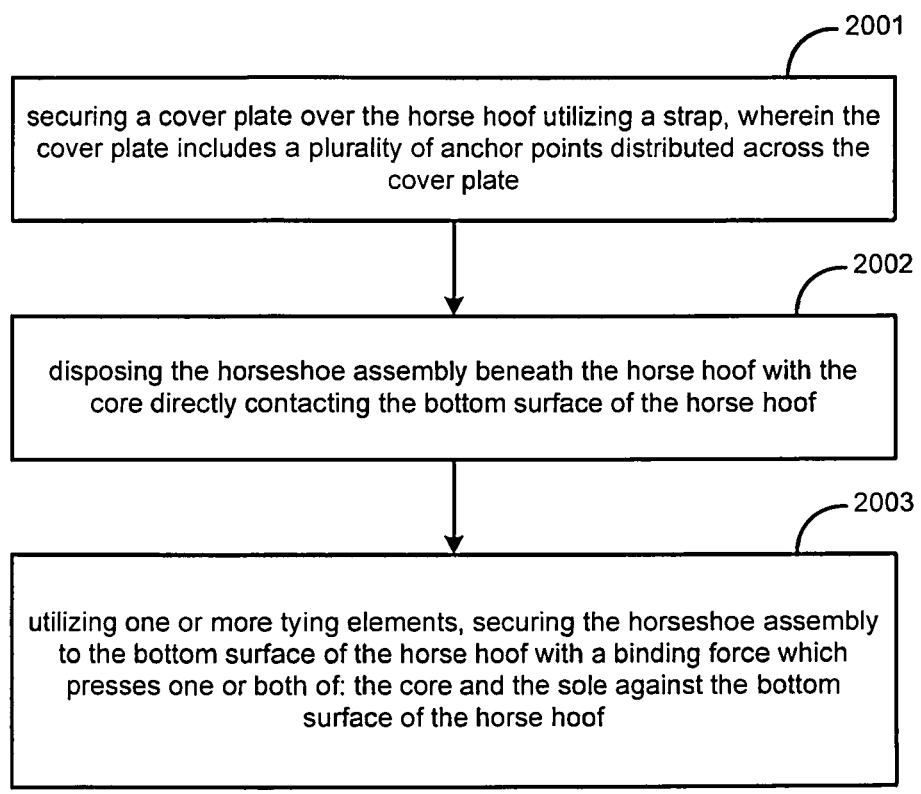

FIG. 2AA illustrates an exemplary method of mounting a horseshoe assembly (200A), according to an embodiment of the disclosure. To fully illustrate the various aspects of the mounting method, relevant portions of FIGS. 2A to 2NA-C may be referred to throughout the description.

FIG. 2A illustrates an exemplary horseshoe assembly (200A) mounting method utilizing a tying element, according to an embodiment of the disclosure. FIG. 2B illustrates a perspective view of an exemplary cover plate (230) for use with a horseshoe assembly (200A). FIG. 2C illustrates a perspective view of an exemplary core (240), which is disposed directly beneath the bottom surface of the horse hoof. FIG. 2D illustrates a perspective view of an exemplary sole (250a) which overlays the core, according to an embodiment of the disclosure.

Figure 2E:
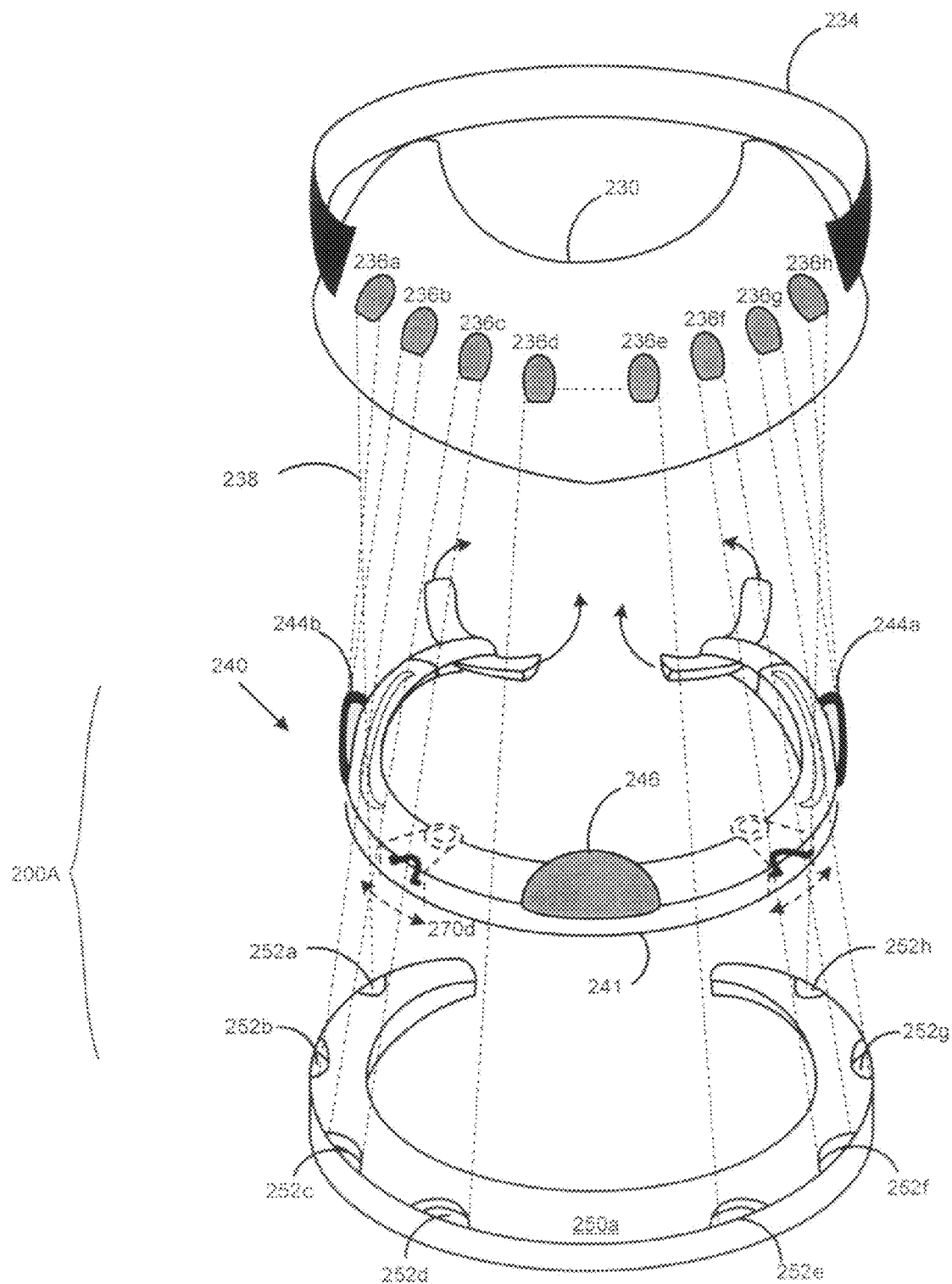
FIG. 2E illustrates a perspective view of an exemplary horseshoe assembly binding method, according to an embodiment of the disclosure.
Figures 2F, 2G:
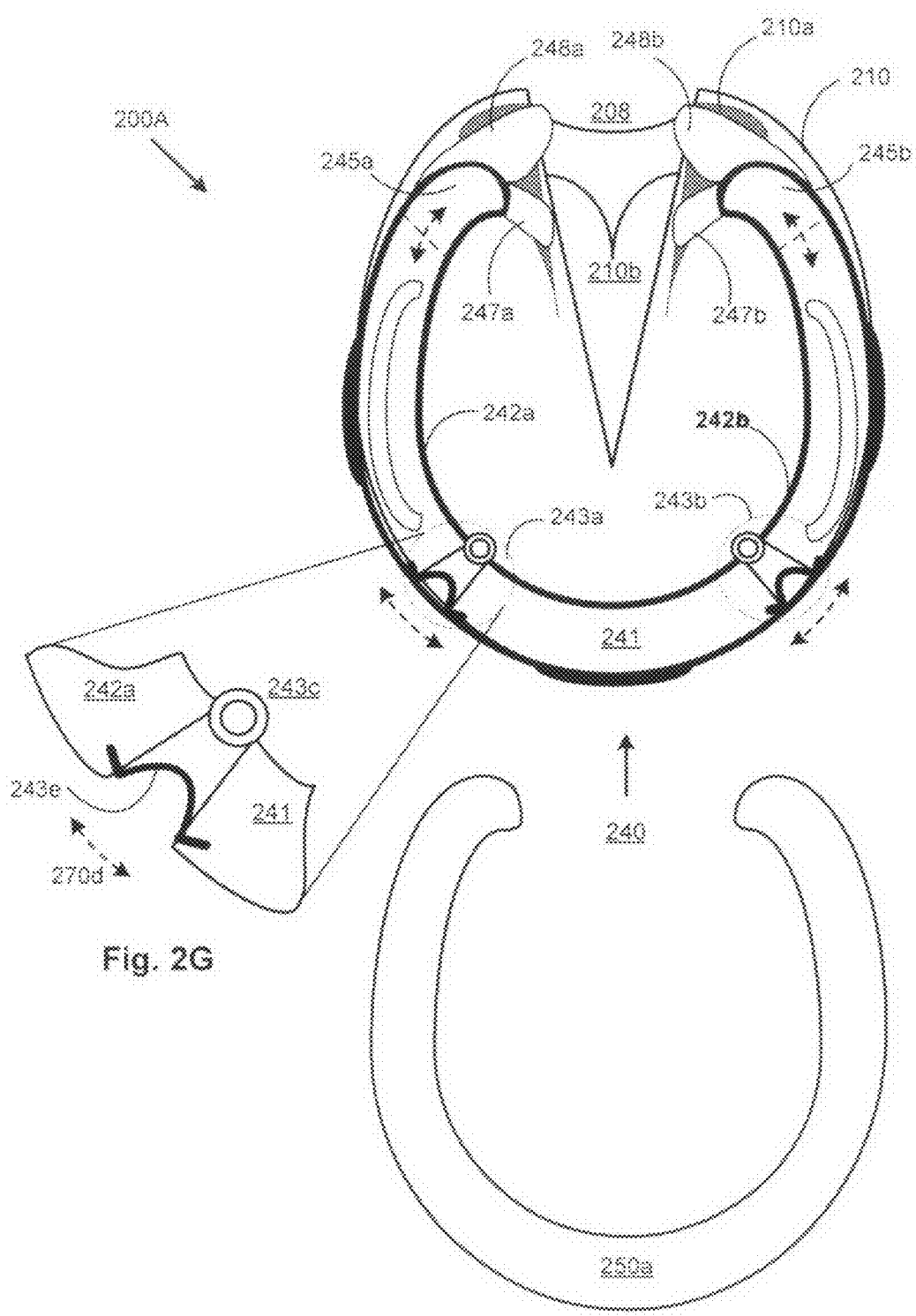
FIG. 2F illustrates a bottom view of the core positioned directly beneath the bottom surface of the horse hoof, prior to placing the sole over the core, according to an embodiment of the disclosure.
FIG. 2G illustrates an exemplary core showing a detail view of the pivoting region, according to an embodiment of the disclosure.

FIG. 2E illustrates a perspective view of an exemplary horseshoe assembly binding method. FIG. 2E illustrates a perspective view of an exemplary horseshoe assembly binding method, according to an embodiment of the disclosure. FIG. 2F illustrates a bottom view of the core positioned directly beneath the bottom surface of the horse hoof, prior to placing the sole over the core. FIG. 2G illustrates an exemplary core showing a detail view of the pivoting region, according to an embodiment of the disclosure.

Referring back to FIG. 2A, there shows a horseshoe assembly (200A) which may include at least a core (240) and a sole (250A), wherein the sole (250A) may overlay or encapsulate the core (240). The horseshoe assembly (200A) may be mounted directly beneath a surface (207) of a horse hoof (202).

In an embodiment, the method for mounting a horseshoe assembly (200A) may include at least the following steps:

Step 2001: securing a cover plate (230) over the horse hoof (202), wherein the cover plate (230) includes a plurality of anchor points (236a-236h) distributed across the cover plate (230). In an embodiment, the cover plate may include an adjustable strap (234) which wraps around the heel region (208) to keep the cover plate from slipping or falling. In another embodiment, the cover plate itself may be a single piece of material with adjustments to function as a strap.

Step 2002: disposing the horseshoe assembly (200A) beneath the horse hoof (202) with the core (240) directly contacting the bottom surface (207) of the horse hoof (202).

Step 2003: utilizing one or more tying elements (238) (such as a lace), securing the horseshoe assembly (200A) to the bottom surface (207) of the horse hoof (202) with a binding force which presses one or both of: the core (240) and the sole (250A) against the bottom surface (207) of the horse hoof (202).

Figure 2H:
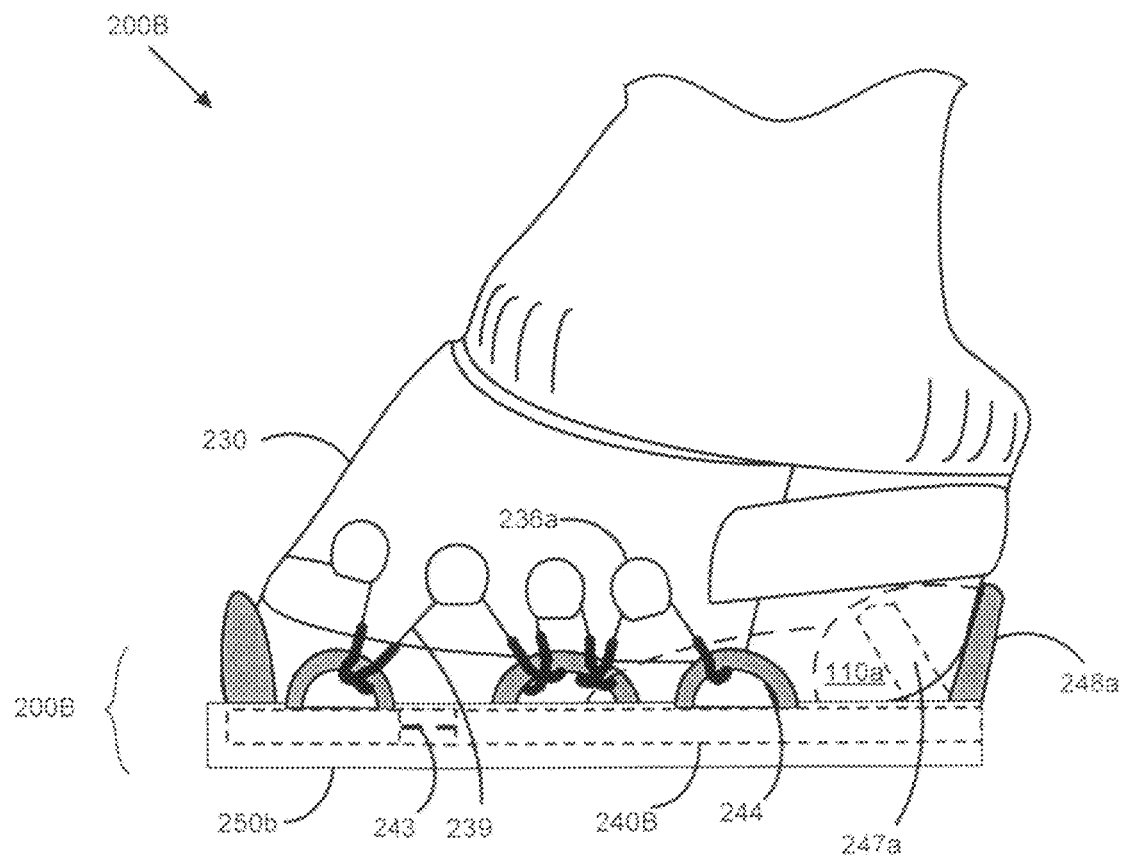
FIG. 2HA illustrates a side view of an exemplary horseshoe assembly mounting method without using nails, according to another embodiment of the disclosure.

FIGS. 2HA to 2KC disclose an alternate embodiment for mounting the horseshoe assembly (200B) beneath a surface of a horse hoof. More specifically, the alternate embodiment includes using a tubular sole (250A) and using hook tie (239) as the tying elements.

As shown in FIGS. 2A and 2HA, the one or more tying elements (238 or 239) utilized to secure the horseshoe assembly (200A or 200B) to the bottom surface (207) of the horse hoof (202) may include one or a combination of:

using a single lace (238) (see FIGS. 2A and 2E) to thread through a respective plurality of openings of a respective plurality of side clips (244a-244f) along an outer edge of the core (240A) as shown in FIG. 2HB or to thread through a respective plurality of openings (252a-252h) along an outer edge of the sole (250A) as shown in FIG. 2D, to anchor to the plurality of anchor points (236a-236h in FIG. 2B) which are distributed across the cover plate (230);

using a plurality of laces (modified from 2A and 2E) to thread through a respective plurality of openings of a respective plurality of side clips (244a-244f) along an outer edge of the core (240A) as shown in FIG. 2HB or to thread through a respective plurality of openings (252a-252h) along an outer edge of the sole (250A) as shown in FIG. 2D, to anchor to the plurality of anchor points (236a-236h in FIG. 2B) which are distributed across the cover plate (230); and using a plurality of hook ties (239 in FIG. 2HA and 2KB) to hook a plurality of openings of a respective plurality of side clips (244a-244f) along an outer edge of the core (240A) as shown in FIG. 2HB or to thread through a respective plurality of openings (252a-252h) along an outer edge of the sole (250A) as shown in FIG. 2D, to anchor to the plurality of anchor points (236a-236h in FIG. 2B) which are distributed across the cover plate (230).

Figure 1B:
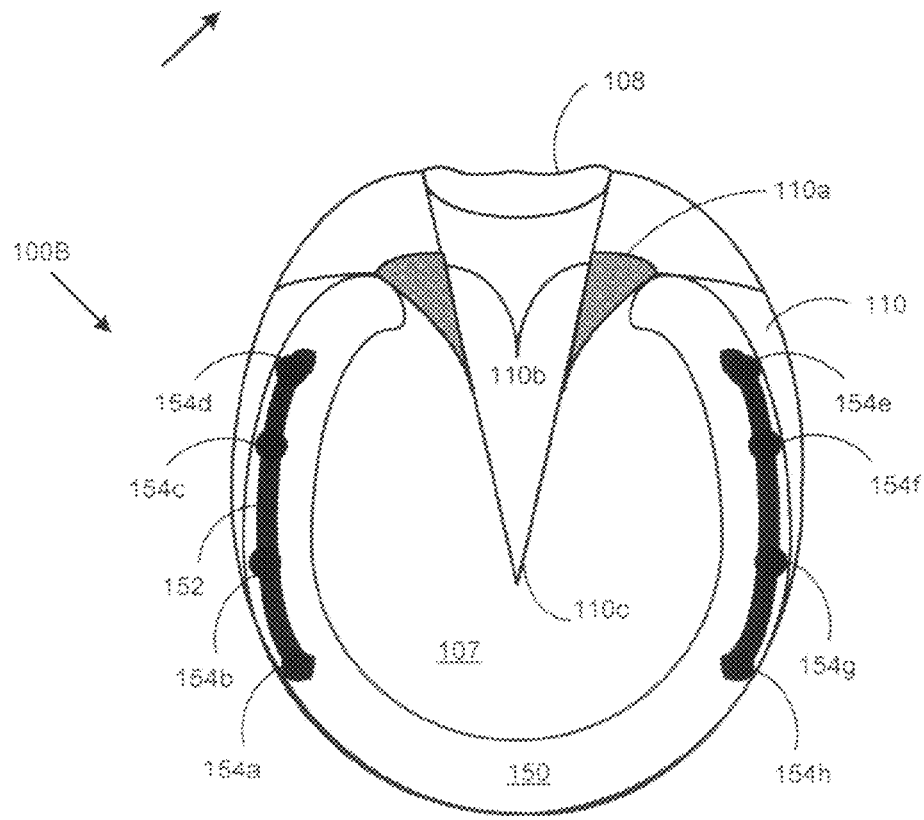
FIG. 1B illustrates a bottom view of the current practice method of mounting a horseshoe beneath a horse hoof as depicted in FIG. 1A, where the horseshoe is nailed directly onto the bottom surface of a horse hoof.

FIGS. 2A and 2HA each discloses that the tying elements (238 or 239) establish a binding force which presses one or both of the core (240 or 240A) and the sole (250A) against the bottom surface (207) of the horse hoof eliminates use of nails (154a-154h in FIG. 1B) in the securing of the horseshoe assembly (200A or 200B) to the bottom surface of the horse hoof.

FIGS. 2A and 2E disclose that the tying element may be a single lace (238) or a plurality of shorter laces (238). Such laces may be a shoe lace, a nylon tie, a steel wire or a stretchable cord. FIGS. 2HA and 2KB disclose that the tying element may be a hook tie (239). The hook tie (239) may include a stretchable tie (239c) with hooks (239a and 239b) on both ends.

Referring to FIG. 2B, there shows that the cover plate (230) is shaped for covering a horse hoof (202). In an embodiment, the cover plate may include an adjustable strap (234) coupled to a front plate (232). The adjustable strap (234) may wrap around a heel region (208) of the horse hoof (202) for securing the cover plate (230) onto the horse hoof (202). In another embodiment, the cover plate (230) itself may be a single piece of material which functions as an adjustable strap to wrap around the horse heel region. A plurality of anchor points (236a-236h) may be disposed on a surface and across the cover plate (230), wherein the plurality of anchor points function as anchoring locations to establish a binding force utilizing one or more tying elements (238 or 239) which secure a horseshoe assembly (200A or 200B) to be mounted directly beneath a surface of the horse hoof, wherein the binding force presses the horse shoe assembly directly against the surface beneath the horse hoof. The cover plate (230) may be constructed from a material including at least one or more of: cloth, synthetic fabric, leather, rubber, sheet metal, steel, alloy, durable plastics, nylon, silicone, composites, and epoxy graphite.

Referring to FIGS. 2C, there shows an embodiment of a core (240) for forming a horseshoe assembly (200A) which is directly mounted beneath a surface of a horse hoof. The core may include: a center piece (241), a first side arm piece (242a) and a second side arm piece (242b), wherein the first side arm piece (242a) and the second side arm piece (242b) are each pivotally coupled to the center piece (241) through a first pivoting region (243a) with a first hinge (243c) and a second pivoting region (243b), with a second hinge (243d), respectively, wherein the first hinge (243c) and the second hinge (243d) enable the first side arm piece (242a) and the second side arm piece (242b) to both pivot towards each other and pivot away from each other, respectively.

FIGS. 2C and 2G disclose in detail that the first pivoting region (243a) includes a first hinge spring (243e) which is inserted between the first side arm piece (242a) and the center piece (241). Likewise, the second pivoting region (243b) includes a second hinge spring (243f) inserted between the second side arm piece (242b) and the center piece (241), respectively.

The first hinge spring (243e) and the second hinge spring (243f) may each produce an opposite force proportional to an amount of compression (270d). More specifically, compression to the first and the second hinge springs (243e, 243f) takes place when one or both of: the first side arm piece (242a) and the second side arm piece (242b) are pivoted away from each other due to a loading force (270) applied by the horse hoof (202).

An equal amount of opposite force to the compression (270d) stored in the first and the second hinge springs (243e, 243f) may enable the first side arm piece (242a) and the second side arm piece (242b) to pivot towards each other until the first side arm piece (242a) and the second side arm piece (242b) each restores to an original neutral position before the compression takes place (i.e., loading removed).

Figure 2N:
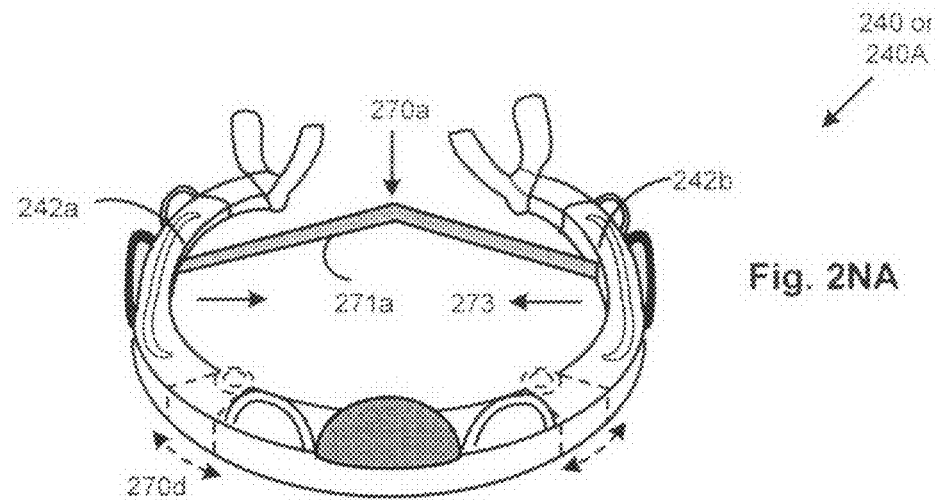
FIGS. 2NA-2NC illustrate various embodiments to implement a spring loaded region, employing a single coupling spring which couples the first and second side arm pieces of the core, according to other embodiments of the disclosure.
Figure 2N:
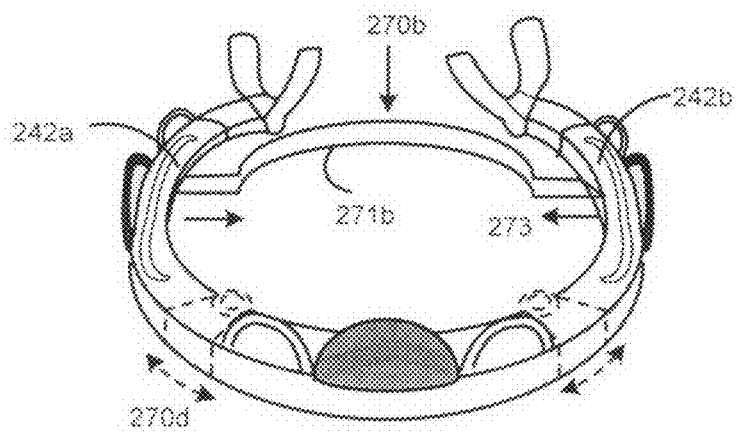
Figure 2N:
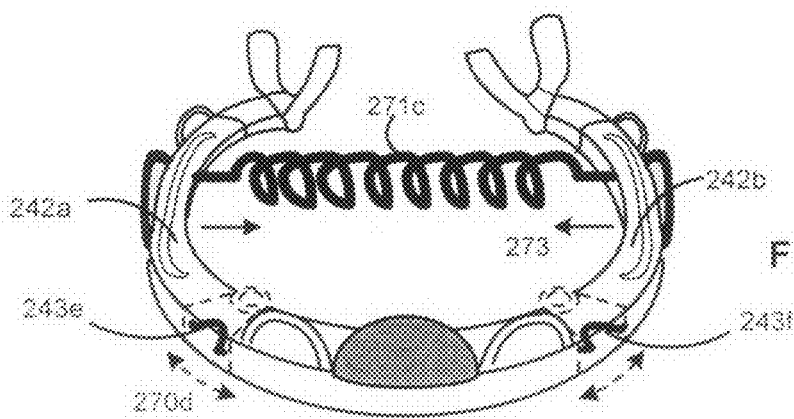

FIGS. 2NA-2NC illustrate various embodiments to implement a spring loaded region, employing a single coupling spring (271a, 271b or 271c) which couples the first and second side arm pieces of the core, according to other embodiments of the disclosure. Similar functions (i.e., storing of energy due to loading and release of energy upon removal of loading) to the first and second hinge springs (243e and 243f) may be implemented using a single coupling spring. In other words, the purpose of using either the first and second hinge springs (243e and 243f) or using the single coupling spring (271a, 271b or 271c) is to simply generate an opposite force (caused by an induced loading stress) to restore the first side arm piece (242a) and the second side arm piece (242b) to an original neutral position upon removal of an induced loading stress.

Referring to FIGS. 2NA, there is shown the first side arm piece (242a) being coupled to the second side arm piece (242b) through a coupling spring (271a) at a neutral resting position (i.e., before inducing a loading stress). In an embodiment, the coupling spring (271a) may be a single metal spring having an inverted V-shape, which at a neutral position may prevent the first side arm piece (242a) and the second side arm piece (242b) from pivoting away from each other.

When a loading stress is induced, the coupling spring 271a may be deformed (e.g., stretched). The deformed coupling spring (271a) may store energy, wherein the stored energy may be proportional to an amount of deformation of the coupling spring (271a) from its neutral or resting position. Deformation to the coupling spring (271a) takes place when one or both of: the first side arm piece (242a) and the second side arm piece (242b) pivots away from each other. Such pivoting of the first and the second side arm pieces (242a, 242b) may be caused by a vertical loading force from a natural movement of the horse hoof (202) such as due to standing, trotting or running motion, which the horse hoof may expand to cause the first and the second side arm pieces (242a, 242b) to pivot away from each other due to compression on the ground.

Upon removal of the stress (i.e., lifting the horse hoof from the ground to take another stride), the energy stored in the coupling spring (271a) may be released to cause one or both of: the first side arm piece (242a) and the second side arm piece (242b) to pivot back towards each other to a relative position. The relative position may be determined by an amount of stored energy released. The first side arm piece (242a) and the second side arm piece (242b) may stop pivoting towards each other after the coupling spring (271a) has released all the stored energy, i.e., the coupling spring (271a) has been restored to its neutral resting position.

FIG. 2NB discloses another embodiment of the coupling spring (271b) which may have an arch shape. FIG. 2NC discloses yet another embodiment of the coupling spring (271c), using a coil spring.

A person of ordinary skill in the art recognizes that any springs, such as the hinge springs (243e, 243f), and the coupling springs (271a to 271c), may operate under Hook's law where the stored energy in the springs may be proportional to the amount of deformation or stress applied. Other types of springs may be used without limiting the design of a spring loaded core (240) to achieve a similar objective to provide pivoting movements to relief horse hoof confinements which cause horse hoof stresses.

It should be pointed out that the coupling spring (271a, 271b or 271c) may be used with (see FIG. 2NC) or without (see FIGS. 2NA and 2NB) the hinge springs (243e, 243f).

Yet in another embodiment, the first and second pivoting regions (243a, 243b) of the core (240. 240A) may not require any spring to operate at all (i.e., absence of first and second hinge springs (243e, 243f) and absence of the single coupling spring (271a to 271c)). In other words, the first and the second arm pieces (242a, 242b) of the core (240, 240A) may pivot freely at the first and second hinges (243c, 243d) without any spring, following the natural movements of the horse hoof.

Referring to FIGS. 2A, 2C and 2HB, there is shown that the center piece (241) of the core (240 or 240A) may include an elevated toe clip (246) which may prevent a toe portion (203) of the horse hoof from slipping forward out of the core (240). In addition, there is shown that the first side arm piece (242a) and the second side arm piece (242b) may each include at least one elevated side clips (244a to 244f) which are disposed along a contour of an outer edge of the core (240 or 240A) for preventing the horse hoof from splaying or slipping sideway out of the core (240 or 240A).

Referring to FIGS. 2C, 2F and 2HB, there is shown that the core (240 or 240A) may include a first heel adjustment piece (245a) being attached to a first tail end of the first side arm piece (242a), and a second heel adjustment piece (245b) being attached to a second tail end of the second side arm piece (242b), wherein the first and the second heel adjustment pieces (245a, 245b) may enable size adjustments of the core to custom fit the horse hoof according to a hoof size. Such adjustment may be necessary since hoof sizes differ from horse to horse, breeds, and may change as the horse ages. In some cases, the front hoofs may be different from the rear hoofs on the same horse.

The core size adjusting may be performed by one or both of: sliding and fastening a first heel adjustment piece (245a) over a portion of the first tail end of the first side arm piece (242a) of the core; and sliding and fastening the second heel adjustment piece (245b) over a portion of the second tail end of the second side arm piece (242b) of the core.

In addition, there is shown in FIGS. 2C, 2F and 2HB, that the first heel adjustment piece (245a) may include an elevated first frog clip (247a) and an elevated first buttress clip (248a) and the second heel adjustment piece (245b) may include an elevated second frog clip (247b) and an elevated second buttress clip (248b), respectively. The first and second elevated frog clips (247a, 247b), the first and second elevated buttress clips (248a, 248b) may facilitate positioning of the core (240 or 240A) in place by pressing against a heel area (208) and pressing against frog and buttress cavity wall areas (210a, 210b), respectively. Such positioning helps prevent the horseshoe assembly from slipping from the heel region (208) of the horse hoof.

Referring to FIGS. 2A, and 2C to 2F, there is shown that the core (240) may be overlaid or encapsulated by a sole (250a) to form the horseshoe assembly (200A), and the core (240) directly contacting the bottom surface (207) of the horse hoof (202). Furthermore, FIGS. 2A and 2E disclose that the core (240) may contact and be secured to the bottom of the horse hoof utilizing the one or more tying elements (238 or 239). The tying elements (238, 239) may tie through the openings (252a-252h) or through the respective plurality of openings of the respective plurality of side clips (244a to 244f) on the horseshoe assembly (200A, 200B) to the cover plate (230) through respective anchor points (236a-236h) on the cover plate (230). The one or more tying elements may press one or both of: the core (240) and the sole (250a) against the bottom surface of the horse hoof.

The core (240 or 240A) may be constructed from a material which includes at least one of: steel, titanium, alloy, carbide, ceramics, high density polymers, composites, epoxy graphite, high molecular weight durable plastics. In modern day technology, the core (240 or 240A) may also be constructed from powder materials with suitable binding agents utilizing a three-dimensional (3D) printer.

Referring to FIGS. 2A, 2E-2F, there disclose an embodiment of a sole (250a) which overlays or encapsulates a core to form a horseshoe assembly (200A, 200B) for mounting on a horse hoof. The sole (250a) may be include a material which is relatively more flexible than the core (240), wherein the sole (250a) may be constructed from one of: a solid molded piece (see FIG. 2D) which is shaped to overlay the core (240), wherein the sole (250a) having a plurality of openings (252a-252h) disposed along a contour of an outer edge of the sole for binding to a plurality of anchor points (236a-236h) distributed across a cover plate (230) which secured on the horse hoof utilizing one or more tying elements (238 or 239), wherein the tying elements secures the horseshoe assembly to the bottom surface (207) of the horse hoof by forming a binding force which presses one or both of: the core (240) and the sole (250a) against the bottom surface of the horse hoof. The sole provides cushioning comfort and improved traction for the horse hoof.

FIGS. 2HB-2HC, 2KA and 2KC disclose another embodiment of the sole (250b), which the sole (250b) may be made from a tubular piece (see FIG. 2HB) with walls on three sides (255a, 255b, 255c) which encapsulates the core (240B) on an inner side, an outer side and a bottom side. In addition, as shown in FIG. 2HA and 2KA, the sole (250b) may be a molded layer which entirely encapsulates the core (250b).

As shown in FIGS. 2E and 2KA, the sole (250a, 250b) may be removable and replaceable without removing the horseshoe assembly (200, 200A). For example, the sole (250a) (i.e., solid sole) may be removed by un-tying or unhooking the tying elements (238 or 239) one by one from the plurality of openings (252a-252h) from the core (240) while the core (240) may still be firmly secured beneath the bottom surface of the horse hoof (see FIG. 2A).

Likewise, the sole (250b) (i.e., tubular sole) may be removed by simply peeling or unfolding the walls (255a-255c) of the sole (250b) out from the core (240A) while the core (240A) may still be firmly secured beneath the bottom surface of the horse hoof (see FIGS. 2HB and 2KA).

Moreover, it should be pointed out that if the sole (250a) is constructed of a solid molded piece, the sole may be attached to the core (240) using adhesive. In this regard, the sole (250a) which is attached using adhesive may simply be removed or replaced by peeling or scrapping the sole (250a) off from the core (240), while the core (240) may remain firmly secured beneath the bottom surface of the horse hoof.

In an embodiment of the disclosure, the sole (250a, 250b) may be constructed from material made from one or more of: polymers, durable plastics, urethane, silicone, composites, rubber and epoxy graphite. Likewise, the sole (250a, 250b) may also be constructed from powder materials with suitable binding agents utilizing a three-dimensional (3D) printer.

To summarize, the horseshoe assembly (200A, 200B) disclosed in the embodiments of the disclosure may overcome the problems of confining the horse hoof from a natural expansion and contraction movements caused by standing, trotting, jumping, etc. (eg: load bearing) Thus better blood circulation to the soft tissues in the frog area (210b) may result in a more healthy horse hoof. The method disclosed in the embodiments provide various binding mechanisms which enable quick and easy mounting and dismounting of the horseshoe assembly (200A, 200B), or quick replacement of the core or the sole. There is not requirement of using nails to nail either the core (240 or 240A) or the entire horseshoe assembly (200) to the hoof capsule (108).

Of course, if one still desires to use nails, the core (240 or 240B) is designed to include slots, grooves or holes (254a, 254b) which one may put nails through the slots, grooves or holes (245a, 245b) on to the hoof capsule (108). The first and second hinges (243c, 243d) and the first and second side arm pieces (242a, 242b) may still enable certain amount of pivoting movements to accommodate the horse hoof's natural movements.

In addition, one may still be able to overlay or encapsulate over the nailed core using the sole (250a, 250b) to provide comfort and shock absorption with reduced noise level and an improved traction when riding on the terrains The foregoing represents only some preferred embodiments of the present disclosures and they may not be construed to limit the present disclosure in any way. Those of ordinary skill in the art will recognize that equivalent embodiments may be created via alterations or modifications without departing from the scope of the technical solutions presented.

What is claimed is:

1. A method for mounting a horseshoe assembly, wherein the horseshoe assembly being directly mounted beneath a surface of a horse hoof, the horseshoe assembly comprises at least a core and a sole, wherein the sole overlays or encapsulates the core, the method comprising:
   securing a cover plate over the horse hoof, wherein the cover plate comprises a plurality of anchor points distributed across the cover plate;
   disposing the horseshoe assembly beneath the horse hoof with the core directly contacting a bottom surface of the horse hoof; and
   utilizing one or more tying elements, securing the horseshoe assembly to the bottom surface of the horse hoof through a binding force which presses the core and optionally the sole against the bottom surface of the horse hoof, wherein the pressing of the core and optionally the sole against the bottom surface of the horse hoof eliminates use of any nails to secure the horseshoe assembly to the bottom surface of the horse hoof; and
   wherein the one or more tying elements are utilized to secure the horseshoe assembly to the bottom surface of the horse hoof, the step of utilizing the one or more tying elements comprises one or a combination of:
      using a single lace to thread through a plurality of respective openings of a respective plurality of elevated side cups along an outer edge of the core to the plurality of anchor points which are distributed across the cover plate;
      using a plurality of laces to thread through the plurality of respective openings of the respective plurality of elevated side cups along the outer edge of the core to the plurality of anchor points which are distributed across the cover plate; and
      using a plurality of hook ties to hook the plurality of respective openings of the respective plurality of elevated side clips along as the outer edge of the core to the plurality of anchor points which are distributed across the cover plate.

2. The method according to claim 1, comprising securing the cover plate to the hoof by strapping the cover plate in place around a heel of the horse hoof, wherein the cover plate is constructed from a material comprising at least one or more of: cloth, fabric, synthetic material, leather, rubber, sheet metal, steel, alloy, durable plastics, nylon, silicone, composites, and epoxy graphite.

3. The method according to claim 1, wherein the core is constructed from a material comprising at least one of: steel, titanium, alloy, carbide, ceramics, high density polymers, composites, epoxy graphite, high molecular weight durable plastics.

4. The method according to claim 1, wherein the core comprises a center piece, a solid single first side arm piece and a solid single second side arm piece, wherein the center piece is free from through slots or through holes for nailing to the bottom surface of the horse hoof, and the solid single first side arm piece and the solid single second side arm piece each comprises respective through slots or through holes for optional nailing nails to the bottom surface of the horse hoof, and the solid single first side arm piece and the solid single second side arm piece are each pivotally coupled to the center piece through a first pivoting region with a first hinge and a second pivoting region with a second hinge, respectively, wherein the first hinge and the second hinge enable the solid single first side arm piece and the solid single second side arm piece to both pivot towards each other and pivot away from each other, respectively.

5. The method according to claim 4, wherein:

the first pivoting region comprises a first hinge spring inserted between the first solid single side arm piece and the center piece, and the second pivoting region comprises a second hinge spring inserted between the solid single second side arm piece and the center piece, respectively, the first hinge spring and the second hinge spring each produces an opposite force proportional to an amount of compression to the respective first and second hinge spring which are inserted between the respective solid single first side arm piece and the center piece, and between the respective solid single second side arm piece and the center piece, wherein:

the compression takes place when one or both of: the solid single first side arm piece and the solid single second side arm piece pivots away from each other, and the opposite force enables the solid single first side arm piece and the solid single second side arm piece to pivot towards each other until the solid single first side arm piece and the solid single second side arm piece each restores to an original neutral position before the compression takes place.

6. The method according to claim 4, wherein:

the solid single first side arm piece is coupled to the solid single second side arm piece through a coupling spring at a neutral resting position which prevents the solid single first side arm piece and the solid single second side arm piece from pivoting towards or away from each other, the coupling spring stores energy when deformed or stretched and the stored energy is proportional to an amount of deformation or stretching from the coupling spring's neutral resting position, wherein the energy is stored when one or both of: the solid single first side arm piece and the solid single second side arm piece pivots away from each other, the coupling spring causes one or both of: the solid single first side arm piece and the solid single second side arm piece to pivot towards each other to a relative position which is determined by an amount of stored energy released, until the solid single first side arm piece and the solid single second side arm piece stop pivoting towards each other after the coupling spring restores to its neutral resting position.

7. The method according to claim 6, wherein the coupling spring comprises a coil spring.

8. The method according to claim 4, wherein the center piece comprises an elevated toe clip which prevents a toe portion of the horse hoof from slipping out of the core during a forward hoof movement.

9. The method according to claim 4, comprising:

attaching steps to attach a first heel adjustment piece to a first tail end of the solid single first side arm piece, and attaching a second heel adjustment piece to a second tail end of the solid single second side arm piece, wherein the first and second heel adjustment pieces facilitate adjustments of a core size to custom fit the horse hoof according to a correct hoof size.

10. The method according to claim 9, wherein the attaching steps comprise one or both of:

sliding and fastening the first heel adjustment piece over a portion of the first tail end of the solid single first side arm of the core; and sliding and fastening the second heel adjustment piece over a portion of the second tail end of the solid single second side arm piece of the core.

11. The method according to claim 9, wherein the first heel adjustment piece comprises an elevated first frog clip and an elevated first buttress clip and the second heel adjustment piece comprises an elevated second frog clip and an elevated second buttress clip, respectively, wherein the first and second elevated frog clips and the first and second elevated buttress clips facilitate positioning the core in place directly beneath the bottom surface of the horse hoof by pressing against a heel area and pressing against frog and buttress cavity wall areas, respectively.

12. The method according to claim 4, wherein each of the first hinge and second hinge is disposed along an inner edge of the core.

13. The method according to claim 1, wherein the sole overlays or encapsulates the core, the sole comprises a material which is relatively more flexible than the core, wherein the sole is constructed from one of:

a solid molded piece which is shaped to overlay the core, wherein the sole has a plurality of openings disposed along a contour of an outer edge of the sole for providing optional binding to the plurality of anchor points distributed across the cover plate which is secured over the horse hoof utilizing the one or more tying elements, wherein the one or more tying elements secure the horseshoe assembly to the bottom surface of the horse hoof by forming the binding force which presses both the core and the sole against the bottom surface of the horse hoof, a tubular piece with walls on three sides which encapsulates the core on an inner side, an outer side and the bottom side of the sole, or a molded layer for entirely encapsulating the core, wherein the sole provides cushioning comfort and improved traction for the horse hoof.

14. The method according to claim 13, wherein the sole comprises material made from one or more of: polymers, durable plastics, urethane, silicone, composites, rubber and epoxy graphite.

15. The method according to claim 1, wherein one or both of the core and the sole are constructed from powder materials with suitable binding agents utilizing a three-dimensional (3D) printer.

16. A method for mounting a horseshoe assembly, wherein the horseshoe assembly being directly mounted beneath a surface of a horse hoof, the horseshoe assembly comprises at least a core and a sole, wherein the sole overlays or encapsulates the core, the method comprising:

securing a cover plate over the horse hoof, wherein the cover plate comprises a plurality of anchor points distributed across the cover plate;

disposing the horseshoe assembly beneath the horse hoof with the core directly contacting a bottom surface of the horse hoof, wherein:

the core comprises at least a center piece, a solid single first side arm piece and a solid single second side arm piece, the center piece is free from through slots or through holes for nailing nails to the bottom surface of the horse hoof, and the solid single first side arm piece and the solid single second side arm piece each comprises a respective through slot or through hole for nailing to the bottom surface of the horse hoof, and the first side arm piece and the second side arm piece are each pivotally coupled to the center piece through a first pivoting region with a first hinge and a second pivoting region, with a second hinge, respectively, wherein the first hinge and the second hinge enable the solid single first side arm piece and the solid single second side arm piece to both pivot towards each other and pivot away from each other, respectively;

nailing nails through the respective through slots or through holes of only the respective solid single first side arm piece and the solid single second side arm piece of the core directly to the bottom surface of the horse hoof; and utilizing one or more tying elements, securing the horseshoe assembly to the bottom surface of the horse hoof with a binding force which presses one or both of: the core and the sole against the bottom surface of the horse hoof; and wherein the one or more tying elements are utilized to secure the horseshoe assembly to the bottom surface of the horse hoof, the step of utilizing the one or more tying elements comprises one or a combination of:

using a single lace to thread through a plurality of respective openings of a respective plurality of elevated side clips along an outer edge of the core to the plurality of anchor points which are distributed across the cover plate;

using a plurality of laces to thread through the plurality of respective openings of the respective plurality of elevated side cups along the outer edge of the core to the plurality of anchor points which are distributed across the cover plate; and using a plurality of hook ties to hook the plurality of respective openings of the respective plurality of elevated side clips along as the outer edge of the core to the plurality of anchor points which are distributed across the cover plate.

17. The method according to claim 16, comprising securing the cover plate to the hoof by strapping the cover plate in place around a heel of the horse hoof, wherein the cover plate is constructed from a material comprising at least one or more of: cloth, fabric, synthetic material, leather, rubber, sheet metal, steel, alloy, durable plastics, nylon, silicone, composites, and epoxy graphite.

18. The method according to claim 16, wherein the core is constructed from a material comprising at least one of: steel, titanium, alloy, carbide, ceramics, high density polymers, composites, epoxy graphite, high molecular weight durable plastics.

19. The method according to claim 16, wherein:

the first pivoting region comprises a first hinge spring inserted between the first solid single side arm piece and the center piece, and the second pivoting region comprises a second hinge spring inserted between the solid single second side arm piece and the center piece, respectively, the first hinge spring and the second hinge spring each produces an opposite force proportional to an amount of compression to the respective first and second hinge spring which are inserted between the respective solid single first side arm piece and the center piece, and between the respective solid single second side arm piece and the center piece, wherein:

the compression takes place when one or both of: the solid single first side arm piece and the solid single second side arm piece pivots away from each other, and the opposite force enables the solid single first side arm piece and the solid single second side arm piece to pivot towards each other until the solid single first side arm piece and the solid single second side arm piece each restores to an original neutral position before the compression takes place.

20. The method according to claim 16, wherein:

the solid single first side arm piece is coupled to the solid single second side arm piece through a coupling spring at a neutral resting position which prevents the solid single first side arm piece and the solid single second side arm piece from pivoting towards or away from each other, the coupling spring stores energy when deformed or stretched and the stored energy is proportional to an amount of deformation or stretching from the coupling spring's neutral resting position, wherein the energy is stored when one or both of: the solid single first side arm piece and the solid single second side arm piece pivots away from each other, the coupling spring causes one or both of: the solid single first side arm piece and the solid single second side arm piece to pivot towards each other to a relative position which is determined by an amount of stored energy released, until the solid single first side arm piece and the solid single second side arm piece stop pivoting towards each other after the coupling spring restores to its neutral resting position.

21. The method according to claim 20, wherein the coupling spring comprises a coil spring.

22. The method according to claim 16, wherein the center piece comprises an elevated toe clip which prevents a toe portion of the horse hoof from slipping out of the core during a forward hoof movement.

23. The method according to claim 16, comprising: attaching steps to attach a first heel adjustment piece to a first tail end of the solid single first side arm piece, and attaching a second heel adjustment piece to a second tail end of the solid single second side arm piece, wherein the first and second heel adjustment pieces facilitate adjustments of a core size to custom fit the horse hoof according to a correct hoof size.

24. The method according to claim 23, wherein the attaching steps comprise one or both of:

sliding and fastening the first heel adjustment piece over a portion of the first tail end of the solid single first side arm of the core; and sliding and fastening the second heel adjustment piece over a portion of the second tail end of the solid single second side arm piece of the core.

25. The method according to claim 23, wherein the first heel adjustment piece comprises an elevated first frog clip and an elevated first buttress clip and the second heel adjustment piece comprises an elevated second frog clip and an elevated second buttress clip, respectively, wherein the first and second elevated frog clips and the first and second elevated buttress clips facilitate positioning the core in place directly beneath the bottom surface of the horse hoof by pressing against a heel area and pressing against frog and buttress cavity wall areas, respectively.

26. The method according to claim 16, wherein the sole overlays or encapsulates the core, the sole comprises a material which is relatively more flexible than the core, wherein the sole is constructed from one of:

a solid molded piece which is shaped to overlay the core, wherein the sole has a plurality of openings disposed along a contour of an outer edge of the sole for providing optional binding to the plurality of anchor points distributed across the cover plate which is secured over the horse hoof utilizing the one or more tying elements, wherein the one or more tying elements secure the horseshoe assembly to the bottom surface of the horse hoof by forming the binding force which presses the core and the sole against the bottom surface of the horse hoof, a tubular piece with walls on three sides which encapsulates the core on an inner side, an outer side and the bottom side of the sole, or a molded layer for entirely encapsulating the core, wherein the sole provides cushioning comfort and improved traction for the horse hoof.

27. The method according to claim 26, wherein the sole comprises material made from one or more of: polymers, durable plastics, urethane, silicone, composites, rubber and epoxy graphite.

28. The method according to claim 16, wherein one or both of the core and the sole are constructed from powder materials with suitable binding agents utilizing a three-dimensional (3D) printer.

29. The method according to claim 16, wherein each of the first hinge and the second hinge is disposed along an inner edge of the core.

* * * * *